United States Patent
Liu et al.

(10) Patent No.: US 8,484,932 B2
(45) Date of Patent: Jul. 16, 2013

(54) VACUUM DEVICE AND METHOD FOR PACKAGING SAME

(75) Inventors: Peng Liu, Beijing (CN); Pi-jin Chen, Beijing (CN); Cai-Lin Guo, Beijing (CN); Bing-chu Du, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 219 days.

(21) Appl. No.: 12/387,850

(22) Filed: May 7, 2009

(65) Prior Publication Data
US 2009/0282781 A1    Nov. 19, 2009

(30) Foreign Application Priority Data
May 14, 2008    (CN) .......................... 2008 1 0067170

(51) Int. Cl.
  *B65B 31/00*    (2006.01)
  *H01J 9/385*    (2006.01)
(52) U.S. Cl.
  USPC ........ 53/400; 53/405; 53/86; 445/25; 445/31; 445/41; 445/42; 445/43; 445/70
(58) Field of Classification Search
  CPC ........ H01J 9/261; H01J 9/40; H01J 9/39; H01J 9/385
  USPC .... 53/400, 403, 405, 408, 79, 85; 206/524.8; 455/25, 31, 41–43, 55, 56, 70
  IPC ..................................... H01J 9/385, 9/39, 9/40
  See application file for complete search history.

(56) References Cited

U.S. PATENT DOCUMENTS

| | | | |
|---|---|---|---|
| 3,477,192 A | | 11/1969 | Brown et al. |
| 3,826,634 A | * | 7/1974 | Blust et al. ...................... 53/403 |
| 3,830,365 A | | 8/1974 | Krueger et al. |
| 3,910,008 A | | 10/1975 | Johnson |
| 3,914,000 A | * | 10/1975 | Beckerman et al. ............ 53/403 |
| 3,926,306 A | * | 12/1975 | Van Nederveen .......... 206/524.8 |
| 4,418,511 A | | 12/1983 | Collin |
| 4,582,210 A | * | 4/1986 | Morimoto et al. ............. 220/2.2 |
| 4,748,797 A | | 6/1988 | Martin |
| 4,770,310 A | * | 9/1988 | Morimoto et al. ............. 220/2.2 |
| 5,269,351 A | | 12/1993 | Yoshihara |
| 5,271,207 A | | 12/1993 | Epstein et al. |

(Continued)

FOREIGN PATENT DOCUMENTS

| | | |
|---|---|---|
| CN | 1801432 A | 7/2006 |
| CN | 101162672 A | 4/2008 |

(Continued)

*Primary Examiner* — Stephen F Gerrity
(74) *Attorney, Agent, or Firm* — Altis Law Group, Inc.

(57) ABSTRACT

A method for establishing a vacuum in a container includes the following steps. The container having an exhaust through hole defined therein is provided. A sealing cover including a connecting material located on the periphery of the sealing cover is provided. The sealing cover is spaced from the exhaust through hole for form at least gaps between the sealing cover and the exhaust through hole. A vacuum is established in the container. The connecting material is heated. The sealing cover covers the exhaust through hole and the connecting material is cooled. After that the container is packaged.

16 Claims, 7 Drawing Sheets

U.S. PATENT DOCUMENTS

| | | | |
|---|---|---|---|
| 5,587,622 A * | 12/1996 | Mohacsi | 445/25 |
| 5,635,795 A * | 6/1997 | Itoh et al. | 313/496 |
| 5,759,668 A * | 6/1998 | Ishikawa et al. | 53/403 |
| 5,797,780 A * | 8/1998 | Peng | 445/25 |
| 5,896,727 A | 4/1999 | Egli et al. | |
| 5,921,837 A * | 7/1999 | Kanagawa et al. | 445/25 |
| 5,964,630 A * | 10/1999 | Slusarczuk et al. | 445/25 |
| 6,039,620 A * | 3/2000 | Itoh et al. | 445/25 |
| 6,146,228 A * | 11/2000 | Mougin et al. | 445/25 |
| 6,147,450 A * | 11/2000 | Fritz et al. | 445/25 |
| 6,416,831 B1 * | 7/2002 | Hara et al. | 206/524.8 |
| 6,457,299 B1 | 10/2002 | Schwenke et al. | |
| 6,459,198 B1 | 10/2002 | Dean et al. | |
| 6,735,845 B2 * | 5/2004 | Jonsson | 445/31 |
| 6,748,726 B2 | 6/2004 | Rossi et al. | |
| 6,827,623 B2 * | 12/2004 | Nakatake et al. | 445/25 |
| 6,843,043 B2 | 1/2005 | Hanson et al. | |
| 6,881,116 B2 * | 4/2005 | Yoon | 445/24 |
| 7,055,298 B2 | 6/2006 | Rossi et al. | |
| 7,081,029 B2 * | 7/2006 | Tagawa et al. | 445/24 |
| 7,758,396 B2 * | 7/2010 | Okawa et al. | 445/25 |
| 7,914,357 B2 * | 3/2011 | Koyanagi et al. | 445/25 |
| 2003/0143914 A1 | 7/2003 | Yoon | |
| 2009/0288364 A1 | 11/2009 | Liu et al. | |

FOREIGN PATENT DOCUMENTS

| | | | |
|---|---|---|---|
| JP | 62259329 A * | 11/1987 | |
| JP | 63116336 A * | 5/1988 | |
| JP | 63207032 A * | 8/1988 | |
| JP | 63284742 A * | 11/1988 | |
| JP | 10-223142 | 8/1998 | |
| JP | H11-120918 | 4/1999 | |
| JP | 11306983 A * | 11/1999 | |
| JP | 2000208051 A * | 7/2000 | |
| JP | 2000215791 A * | 8/2000 | |
| JP | 2003-151436 | 5/2003 | |
| JP | 2003-229059 | 8/2003 | |
| JP | 2004055480 A * | 2/2004 | |
| JP | 2004-515880 | 5/2004 | |
| JP | 2005-11558 A | 1/2005 | |
| JP | 2005011558 A * | 1/2005 | |

* cited by examiner

<RELATED ART>

<RELATED ART>

VACUUM DEVICE AND METHOD FOR PACKAGING SAME

BACKGROUND

1. Technical Field

The present disclosure relates to vacuum technologies and, in particular, to a vacuum device and a method for packaging the same.

2. Description of the Related Art

Some vacuum devices, such as flat panel displays (FPD), are packaged vacuum devices that are used in connection with computers, television sets, camcorder viewfinders, and other electronic devices. Referring to FIG. 6, according to the prior art, a typical packaging method of the vacuum device is shown. The packaging method includes the following steps. A pre-packaged container 100 having an exhaust through hole 102 defined thereon is provided. An exhaust pipe 110 is provided and one end of the exhaust pipe 110 is inserted into and fixed in the through hole 102 via low-melting glass powder 108, and another end of the exhaust pipe 110 is exposed outside the pre-packaged container 100. A cup-shaped connector 104 and a vacuum pump 106 that connects to the cup-shaped connector 104 is provided. The cup-shaped connector 104 is configured for form a seal between the exhaust pipe 110 and the vacuum pump 106 so as to pump from the pre-packaged container 100 to create a vacuum chamber therein via the vacuum pump 106. A condensing-light sealing device 112 is provided and is used for heating and softening the exhaust pipe 110 so as to seal one end of the exhaust pipe 110. One end of the exhaust pipe 110 is sealed to obtain a container under vacuum.

The container under vacuum includes the container 100 and the exhaust pipe 110 whose one end is sealed. Alternatively, it can be understood that the pre-packaged container 100 may be directly placed into a vacuum room 114 as shown in FIG. 7. After the vacuum room 114 is pumped to create vacuum therein via the vacuum pump 106, a vacuum also is created in the pre-packaged container 100 at the same time. After that, the exposed end of the exhaust pipe 110 can be sealed via the condensing-light sealing device 112.

However, the exhaust pipe 110 needs to be disposed in the through hole 102 of the container 100 in the above method during packaging the container 100. Therefore, when finishing the package of the container 100, a tail of the exhaust pipe 110 may be retained outside of the container 100, which is disadvantageous in regards of safety and reliability. Furthermore, for expediently sealing the end of the exhaust pipe 110, the exhaust pipe 110 should have a small diameter, for example, less than 5 mm, which results in expending a lot of time exhausting air from the pre-packaged container 100. Therefore, the structure of the container 100 becomes complicated and the manufacture cost will be increased.

What is needed, therefore, is a packaging method for a vacuum device, which can overcome the above-described shortcomings.

BRIEF DESCRIPTION OF THE DRAWINGS

The present vacuum device and a method for packaging the same are described in detail hereinafter, by way of example and description of an exemplary embodiment thereof and with references to the accompanying drawings, in which.

DETAILED DESCRIPTION

A detailed explanation of a vacuum device and a method for packaging the same according to an exemplary embodiment will now be made with references to the drawings attached hereto.

Figure 1:
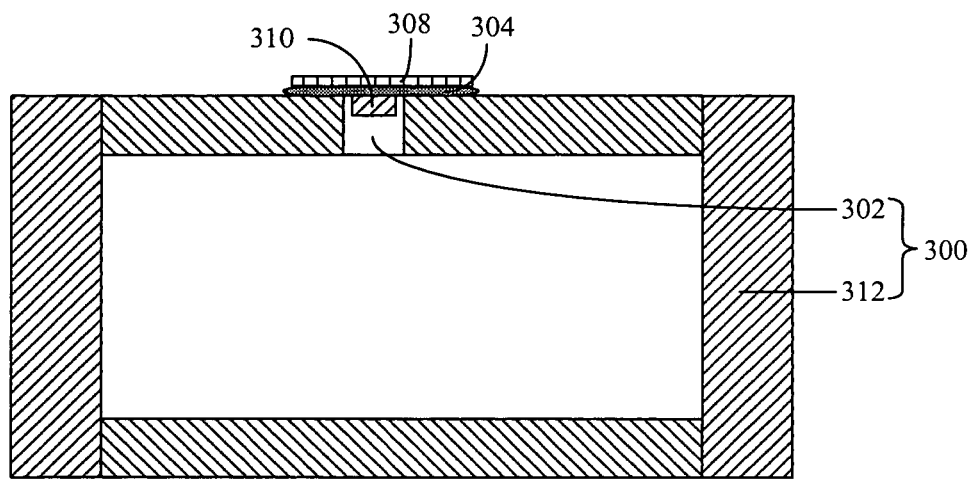
FIG. 1 is a schematic, cross-sectional view of a vacuum device according to an exemplary embodiment.

Referring to FIG. 1, a vacuum device 30 according to an exemplary embodiment is shown. The vacuum device 30 includes a container 300 having an exhaust through hole 302 defined therein, a sealing cover 308 configured for covering the exhaust through hole 302, a connecting material 304 and a getter 310. The getter 310 is disposed on the sealing cover 308 toward the inside of the container 300.

The container 300 includes a housing 312. The exhaust through hole 302 can be defined in any one sidewall of the housing 312. The housing 312 may be made a material selected from a group consisting of glass, metal and other material that can be adhered utilizing low-melting glass power. It should be further noted that the vacuum device 30 is an element of a flat panel display, and the housing 312 includes a rear plate, a front plate and spacers disposed between the rear plate and the front plate (not labeled). Some electron elements (not shown) are contained in the housing 312. In the present embodiment, the housing 312 is comprised of glass. The exhaust through hole 302 can be any opening that is appropriate to the volume of the housing 312. In the present embodiment, the exhaust through hole 302 has a circular shape and has a diameter of about 2 mm to about 10 mm. However, it is understood too large of a diameter of the exhaust through hole 302 may result in poor reliability.

The sealing cover 308 may have a plate shape and a greater area than that of the exhaust through hole 302 for fully covering the exhaust through hole 302. The sealing cover 308 may be made of glass or metal and have a greater melting point than that of the connecting material 304. In the present embodiment, the sealing cover 308 is made of glass that has a melting point higher than 600° C.

The connecting material 304 may be a layer of low-melting glass powder which is placed along the periphery of the sealing cover 308 manually or via screen-printing method. The connecting material 304 is interposed between the container 300 and the sealing cover 308 so as to adhere the housing 312 with the sealing cover 308. The connecting material 304 may have some air in therein. During packaging, the connecting material 304 is heated for a predetermined period of time to remove the air therein before mounting the sealing cover 308.

The getter 310 may be mounted on one side of the sealing cover 308 on which the low-melting glass power is located and is configured for absorbing the residual gas in the packaged container 300 after sealing. The getter material generally includes two types: evaporable, and non-evaporable. The evaporable-type getter is mainly made from barium (Ba), magnesium (Ma), strontium (Sr), calcium (Ca), such as barium-aluminum-nickel getter or nitrogen-doped getter. The non-evaporable-type getter is mainly made from titanium (Ti), zirconium (Zr), hafnium (Hf), thorium (Th), vanadium (V), aluminum (al), iron (Fe), or any of their alloys. In the present embodiment, the getter 310 is non-evaporable-type getter made of zirconium, vanadium and iron. Since the getter 310 is directly formed on the sealing cover 308, a separate space for containing getter materials is not needed in the device, which will simplify the structure of the vacuum device 300 and further decrease the manufacturing costs.

Figure 2:
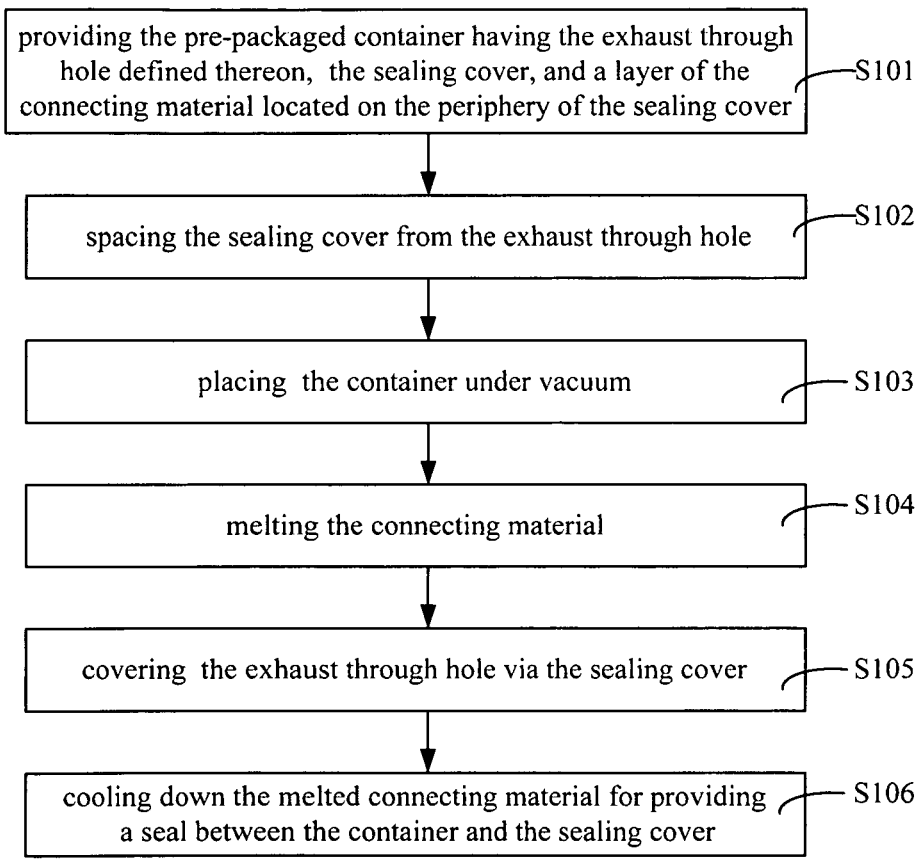
FIG. 2 is a flowchart of a packaging method for the vacuum device of FIG. 1.

Referring to FIG. 2, a packaging method according to the exemplary embodiment is shown. The packaging method includes:

step S101: providing: the pre-packaged container 300, having the exhaust through hole 302 defined thereon, and the sealing cover 308, and a layer of the connecting material 304 located on the periphery of the sealing cover 308;

step S102: spacing the sealing cover 308 from the exhaust through hole 302;

step S103: placing the pre-packaged container 300 under vacuum;

step S104: melting the connecting material 304;

step S105: covering the exhaust through hole 302 with the sealing cover; and steps 106: cooling down the melted connecting material 304 for providing a seal between the container 300 and the sealing cover 308.

In step S101, in some embodiments, the connecting material 304 is firstly mixed with an adhesive to form a slurry. Then, the slurry is coated on the sealing cover 308 manually or via screen-printing method. In one embodiment, the connecting material 304 has a thickness of less than 1 mm.

Figure 3:
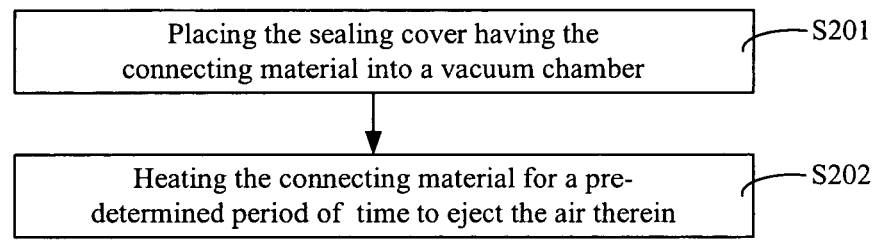
FIG. 3 is a flowchart of a method for exhausting the air in the low-melting glass powder.

In step S102, the connecting material 304 firstly need to be heated so as to remove the air in the connecting material 304. Referring to FIG. 3, the method for removing the air in the connecting material 304 including:

step S201: placing the sealing cover 308 having the connecting material 304 into a vacuum chamber;

step S202: heating and melting the connecting material 304 for a predetermined period of time to exhaust the air therein.

In step S202, the connecting material 304 can be heated by electrically heated wire, infrared light or laser. In the present embodiment, the connecting material 304 is heated via electrically heating or irradiation of the infrared light for about 30 minutes to about 60 minutes so as to exhaust all of gas included therein. Then, the getter 310 can be adhered on the cover with the connecting materials. In the present embodiment, the connecting materials is the low melting point frit.

For spacing from the exhaust through hole 302, at least three rod-shaped supporting elements 306 may be arranged on the periphery of the exhaust through hole 302. The rod-shaped supporting elements 306 are configured for supporting the sealing cover 308 to form at least one gap between the sealing cover 308 and the housing 312 for efficiently allowing air in the housing 312 to escape. In one embodiment, the supporting elements 306 are also made of low-melting glass and have a height larger than 2 mm. Understandably, other methods can be employed for spacing the exhaust through hole 302 with the sealing cover 308. The sealing cover 308, for example, can be held by an element of some kind (not shown).

Figure 4:
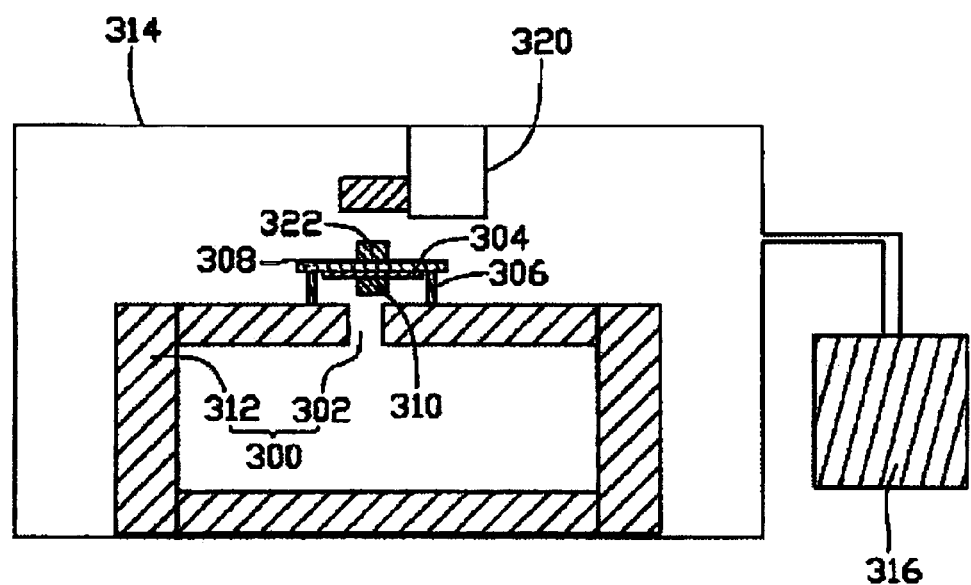
FIG. 4 is a schematic, cross-sectional view of the vacuum device of FIG. 1 connected to a vacuum pump.
Figure 5:
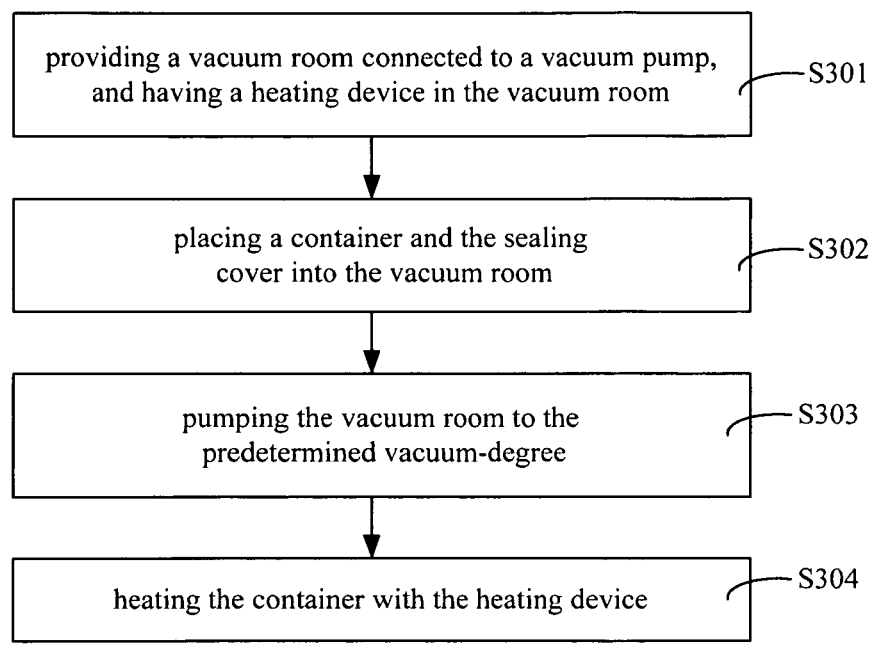
FIG. 5 is a flowchart of a method for pumping the container to create a vacuum therein.
Figure 6:
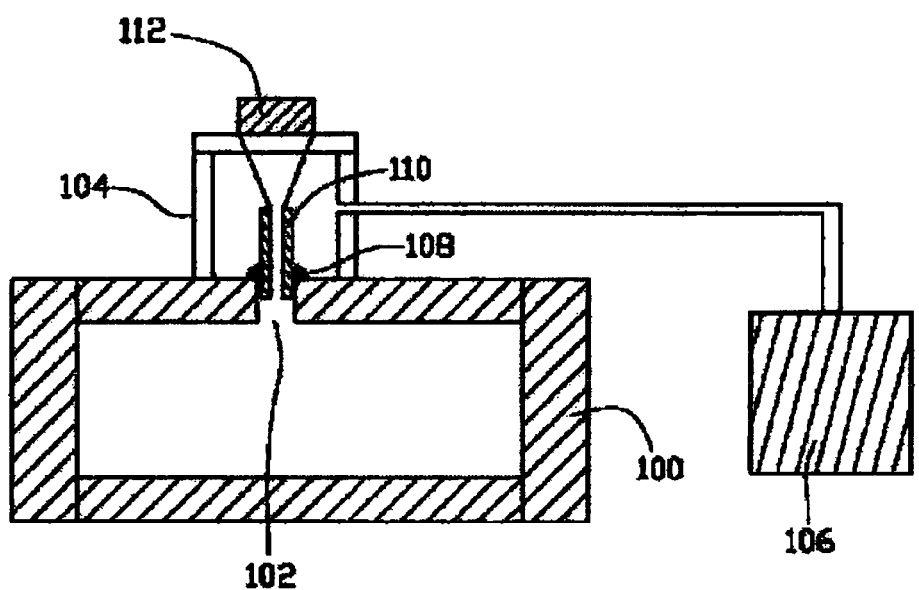
FIG. 6 is a typical vacuum device that is connected with a vacuum pump via a cup-shaped connecter.
Figure 7:
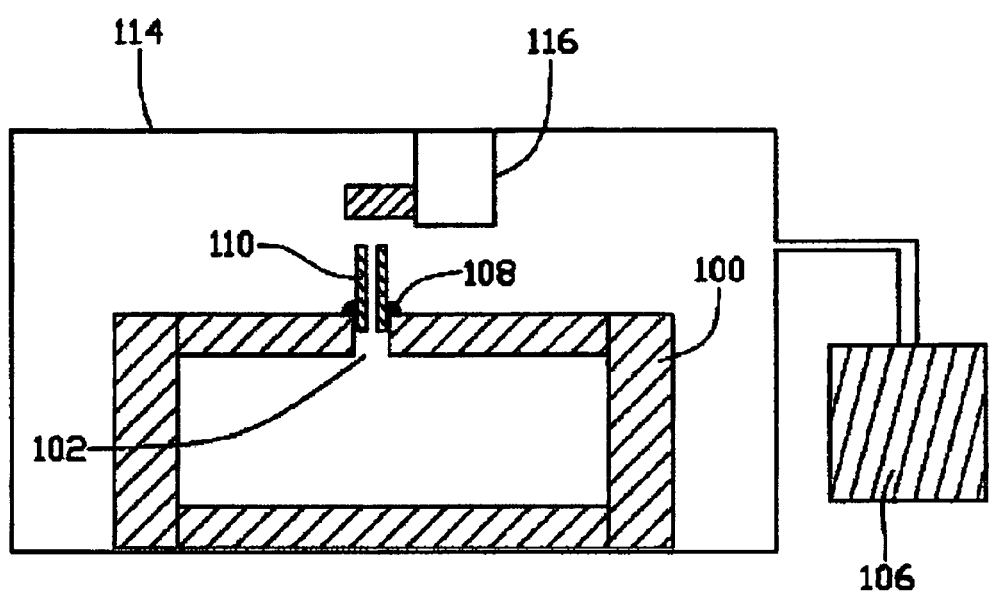
FIG. 7 is another typical vacuum device that is placed into a vacuum room.

In step S103, the pre-packaged container 300 can be pumped via a cup-shaped connector or in a vacuum room. In the present embodiment, referring to FIG. 4, the container 300 is placed into the vacuum room 314. When the vacuum room 314 is pumped to a predetermined vacuum-degree, the pre-packaged container 300 may have a same vacuum-degree with the vacuum room. Referring to FIGS. 5-6, in some embodiments, the method for pumping the pre-packaged container 300 to create vacuum therein includes:

step S301: providing a vacuum room 314 connected to a vacuum pump 316 and a heating device 320 mounted on an inner-wall of the vacuum room 314;

step S302: placing the pre-packaged container 300 and a sealing cover 308 arranged on the exhaust through hole 302 of the pre-packaged container 300 into the vacuum room 314;

step S303: pumping the vacuum room 314 to a predetermined vacuum-degree;

step S304: heating the pre-packaged container 300 by the heating device for further exhausting the gas in the container 300.

In step S304, the heating device 320 can be electrically heating wire, infrared light and/or laser. At the same time, the getter 310 can be activated to absorb gas during heating the pre-packaged container 300.

In step S106, when the heating device 320 stops, the temperature of the connecting material 304 and the supporting spacer 306 may decrease and the connecting material 304 and the supporting spacer 306 may solidify. At the same time, the sealing cover 308 is adhered on the exhaust through hole 302. Thus, the container 300 is packaged by the sealing cover 308 and vacuum has been created in the container 300 having a predetermined vacuum degree.

Furthermore, an object 322 may be disposed on the top of the sealing cover 308 to provide an external force for the sealing cover 308. When the connecting material 304 and the supporting elements 306 are melted, it can fully seal the exhaust through hole 302 via the sealing cover 308.

Since the plate-shaped sealing cover 302 is used for sealing the exhaust through hole 302 of the container 300, no tail of the exhaust pipe of prior art is retained outside of the container 100, which is advantageous of safety and reliability. Furthermore, as the exhaust through hole 30 may have a larger diameter, the air in the container 300 can be more quickly removed therefrom. Therefore, the structure of the vacuum device becomes simpler, and the manufacture cost will be decreased.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

It is also to be understood that above description and the claims drawn to a method may include some indication in reference to certain steps. However, the indication used is only to be viewed for identification purposes and not as a suggestion as to an order for the steps.

What is claimed is:

1. A method for establishing a vacuum in a container, the container comprising an exhaust through hole defined on a top of the container, comprising:

providing the container, a sealing cover, and a layer of a connecting material located on a periphery of a lower side of the sealing cover, wherein the connecting material has a lower melting-point than that of the sealing cover;

arranging one or more supporting elements on and in contact with the container at the periphery of the exhaust through hole to support the sealing cover and space the sealing cover from the exhaust through hole above the exhaust through hole;

creating vacuum in the container;

melting the connecting material and the one or more supporting elements;

covering the exhaust through hole via the sealing cover; and cooling down the melted connecting material and the one or more supporting elements to provide a seal between the container and the sealing cover.

2. The method as claimed in claim 1, wherein the connecting material is placed along the periphery of the lower side of the sealing cover manually or via screen-printing method.

3. The method as claimed in claim 1, further includes a step of removing the air located in the connecting material.

4. The method as claimed in claim 3, wherein the step of removing the air in the connecting material comprises:

placing the sealing cover with the connecting material into a vacuum chamber; and heating the connecting material for a predetermined period of time to eject the air therein.

5. The method as claimed in claim 1, wherein the creating vacuum in the container comprises:

providing a vacuum room connected to a vacuum pump, and having a heating device in the vacuum room;

placing the container and the sealing cover into the vacuum room;

pumping the vacuum room to the predetermined vacuum-degree; and heating the container with the heating device.

6. The method as claimed in claim 5, wherein the heating device is selected from the group consisting of electrical heating wire, infrared light and laser.

7. The method as claimed in claim 1, wherein the one or more supporting elements are made of the glass powder.

8. The method as claimed in claim 1, wherein the connecting material comprising a lower melt glass powder.

9. The method as claimed in claim 1, further comprising a step of disposing an object on a top of the sealing cover to provide an external force for the sealing cover.

10. An apparatus, the apparatus comprising:

a container having an exhaust through hole;

a flat sealing cover above and covering the exhaust through hole;

a connecting material located between the container and the flat sealing cover, the connecting material being adapted to form a seal between the container and the flat sealing cover, and a melting point of the sealing cover being greater than that of the connecting material;

one or more supporting elements being located on the container at the periphery of the exhaust through hole to support the sealing cover and space the sealing cover from the exhaust through hole above the exhaust through hole, the one or more supporting elements being in contact with both the container and the sealing cover; and a vacuum room accommodating the container, the flat sealing cover, the connecting material, and the one or more supporting elements.

11. The apparatus as claimed in claim 10, further comprising a vacuum pump, wherein the vacuum room is connected to a vacuum pump.

12. The apparatus as claimed in claim 11, further comprising a heating device, wherein the heating device is accommodated by the vacuum room and mounted on an inner-wall of the vacuum room to heat the container.

13. The apparatus as claimed in claim 10, further comprising a getter accommodated by the vacuum room and disposed on the flat sealing cover and located in the exhaust through hole.

14. The apparatus as claimed in claim 10, further comprising an object disposed on a top of the flat sealing cover.

15. The apparatus as claimed in claim 10, wherein the one or more supporting elements have a height larger than 2 mm.

16. An apparatus, the apparatus comprising:

a container having an exhaust through hole;

a flat sealing cover above and covering the exhaust through hole;

a connecting material located between the container and the flat sealing cover, and a melting point of the sealing cover being greater than that of the connecting material;

one or more supporting elements being stood on the container at the periphery of the exhaust through hole to support the sealing cover and define a gap allowing air in the container to escape between the flat sealing cover and the container, the one or more supporting elements being in contact with both the container and the sealing cover;

an object disposed on a top of the flat sealing cover to provide an external force for the sealing cover; and a vacuum room accommodating the container, the flat sealing cover, the connecting material, and the one or more supporting elements.

* * * * *